United States Patent [19]

Ludwig et al.

[11] Patent Number: 4,905,535
[45] Date of Patent: Mar. 6, 1990

[54] GEAR WHEEL MECHANISM

[75] Inventors: Werner Ludwig, Darmstadt; Rainer Nickel, Lohr/Main, both of Fed. Rep. of Germany

[73] Assignee: Mannesmann Rexroth GmbH, Fed. Rep. of Germany

[21] Appl. No.: 117,364

[22] Filed: Oct. 28, 1987

Related U.S. Application Data

[63] Continuation of Ser. No. 871,266, Jun. 6, 1986, abandoned.

[30] Foreign Application Priority Data

Jun. 7, 1985 [DE] Fed. Rep. of Germany ....... 3520443

[51] Int. Cl.$^4$ .......................................... F16H 57/04
[52] U.S. Cl. ...................................... 74/468; 418/77
[58] Field of Search ................... 74/460, 467, 468; 418/77, 79, 170, 171

[56] References Cited

U.S. PATENT DOCUMENTS

| 1,271,970 | 7/1918 | Wood | 418/79 |
| 1,348,773 | 8/1920 | Auger | 418/79 |
| 1,751,634 | 3/1930 | Holmes | 74/468 |
| 1,795,579 | 3/1931 | Storey | 418/77 |
| 1,861,708 | 6/1932 | Miki | 418/77 |
| 2,391,072 | 12/1945 | Pugh | 418/77 |
| 2,400,485 | 5/1946 | Cardillo | 418/77 X |
| 2,624,287 | 1/1953 | Ilyin | 418/79 X |
| 2,989,951 | 6/1961 | Charlson | 418/171 X |
| 3,096,720 | 7/1963 | Younger | 418/170 X |
| 3,547,565 | 12/1970 | Eddy | 418/171 X |
| 3,680,989 | 8/1972 | Brundage | 418/79 X |
| 4,235,217 | 11/1980 | Cox | 418/171 X |

FOREIGN PATENT DOCUMENTS

| 204849 | 8/1959 | Austria | 74/468 |
| 731332 | 12/1942 | Fed. Rep. of Germany . | |
| 1941641 | 2/1971 | Fed. Rep. of Germany . | |
| 2933493 | 3/1981 | Fed. Rep. of Germany . | |
| 894308 | 12/1944 | France | 74/467 |
| 58-217788 | 12/1983 | Japan | 418/77 |
| 59-176487 | 10/1984 | Japan | 418/77 |
| 593620 | 10/1947 | United Kingdom | 418/79 |
| 947382 | 1/1964 | United Kingdom | 418/77 |

Primary Examiner—James R. Brittain
Attorney, Agent, or Firm—Roylance, Abrams, Berdo & Goodman

[57] ABSTRACT

A hydrostatic gear wheel mechanism has two intermeshing gear wheels in the work space of a housing. To continuously rinse the gear wheel and housing surfaces which slide on each other, grooves on the gear wheel convey lubricant from the work space to between the gear wheel front faces and the axial end walls of the work space.

7 Claims, 4 Drawing Sheets

GEAR WHEEL MECHANISM

This is a continuation of application Ser. No. 871,266 filed June 6, 1986, abandoned.

FIELD OF THE INVENTION

The invention relates to a gear wheel mechanism with grooves in at least one gear wheel to convey lubricant from its housing work space to its axial faces.

BACKGROUND OF THE INVENTION

In a known gear wheel mechanism, the recesses extend across the entire front face of the gear wheel surface connecting its inner and outer surfaces. Due to the play of the bearing of the outside gear wheel, the suction and pressure sides of the gear wheel mechanism are connected, strongly influencing its degree of effectiveness. See, e.g., German D OS 29 33 493.

Another known gear wheel mechanism has axial grooves in the area of the middle pressure point in the inside housing wall. The axial grooves are connected with radial grooves in the flat housing wall and with grooves of the inside cover wall. These radial grooves open into annular spaces connected in turn with one of the bearings. The groove arrangement lubricates the top bearing by means of oil from the propulsion flow. See, e.g., German OS 19 41 641.

A known gear wheel pump has a device for preventing oil losses by leakage. The individual teeth of the pump wheels are provided with grooves on their broad side. The pump wheel body is provided with at least one concentric annular groove connected with the other grooves. The individual grooves of the teeth are connected by axial and radial bores. The grooves on the front faces of the teeth each receive a packing element. The groove arrangement causes the pressure, arising as a result of squeezing liquid, to press the packing element against the pump housing, see e.g., German PS 731 332.

SUMMARY OF THE INVENTION

An object of the present invention is to provide a gear wheel mechanism in which the surfaces which slide against each other are continuously rinsed with lubricant.

Another object of the present invention is to provide a gear wheel mechanism having a pressure side or port and a suction side or port which are not directly or freely connected.

The foregoing objects are obtained by a hydrostatic gear wheel mechanism comprising first and second gear wheels mounted in a work space of a housing. The gear wheels have front faces and pluralities of radially extending teeth defining intermediate spaces with bases between adjacent pairs of teeth. At least the first gear wheel has groove-like recesses on at least one of its front faces. The recesses extend radially relative to the first gear wheel, reach a level of the bases between the teeth of the first gear wheel and are connected with the work space. Each recess is connected only with one axial end of the work space.

By forming the gear wheel mechanism in this manner, the recesses are in direct fluid communication with the work spaces, and alternate between limited fluid communication with the pressure side and the suction side of the mechanism. No connection or direct fluid communication is provided between the side of the gear wheel from which the teeth extend and the bearing side of the gear wheel such that there is no direct fluid communication between the pressure and suction sides of the gear wheel mechanism. The recesses are connected with the work space in a manner sufficient to lubricate the gearwheel mechanism parts which slide relative to and on each other, to cool these parts and to rinse out penetrating foreign particles within the mechanism.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
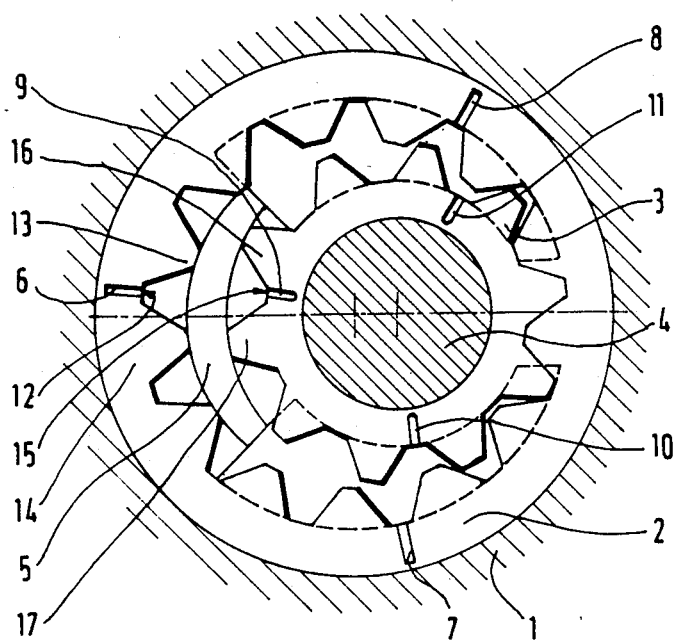
FIG. 1 is a front elevational view in section of a gear wheel mechanism according to a first embodiment of the present invention.

The gear wheel mechanism of FIG. 1 has a stationary housing 1, in which an outer hollow gear wheel 2 with radially inwardly extending teeth is rotatably supported. A pinion or inner gear wheel 3 is nonrotatably or fixedly coupled to a shaft 4. Shaft 4 is arranged eccentrically to hollow gear wheel 2. Pinion 3 meshes with hollow gear wheel 2. The axial front faces of the gear wheels are arranged perpendicular to the rotational axis of gear wheel 2 or 3 and face axially limiting walls in housing 1 limiting the work space. An intermediate member 5 is connected tightly or fixed to housing 1 at the point where adjacent teeth of hollow gear wheel 2 and pinion 3 have their greatest spacing from each other. Intermediate member 5 is essentially sickle-shaped. Shaft 4 is rotatably mounted in housing 1.

Radial grooves 6-8 and 9-11, configured as recesses, are located on both sides of hollow gear wheel 2 and pinion 3, respectively. Only the radial grooves 6-8 and 9-11 on one side can be seen in FIG. 1.

Radial groove 6 is connected with a base 12 of an intermediate space or a tooth space between two adjacent teeth 13 and 14 of hollow gear wheel 2. Groove 6 extends through gear wheel 2 to the vicinity of housing 1, but terminates before the outer surface of gear wheel 2. Radial grooves 6-8 are of identical configuration and are arranged with nearly identical circumferential spacing.

Radial groove 9 extends outwardly from a base 15 of a tooth space between two adjacent teeth 16 and 17 of pinion 3 and reaches the vicinity of shaft 4, but terminates before the inner surface of pinion 3. Radial grooves 9-11 are of identical configuration and arranged with nearly identical circumferential spacing.

Each of the grooves 6-8 and 9-11 is connected with the intermediate space between two adjacent teeth.

The area illustrated near the top in FIG. 1, framed by a broken line, can be the suction side or port. The area surrounded by a broken line near the bottom can be the pressure side or port of a pump, or vice versa. This area can also be the pressure or inlet side of a motor, while the other area is the outlet or pressure-less side of the motor.

The same references are used for the same parts in the other exemplary embodiments. Modifications are indicated by the addition of a letter.

Figure 2:
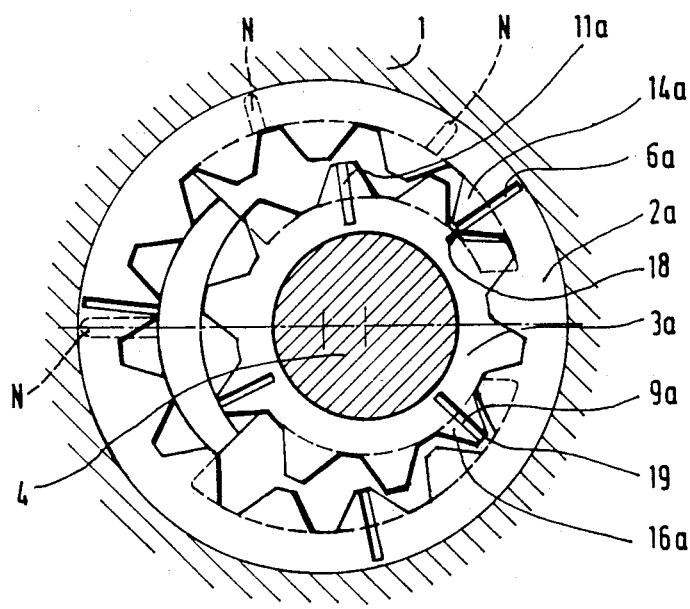
FIG. 2 is a front elevational view in section of a gear wheel mechanism according to a second embodiment of the present invention.

The radial groove 6a shown in FIG. 2 extends radially outwardly from the point 18 of tooth 14a of hollow gear wheel 2a to the vicinity of, but spaced from, housing 1. Radial grooves 6a to 8a are of identical configuration and are arranged with nearly identical circumferential spacing.

Radial groove 9a extends radially inwardly from point 19 of tooth 16a of pinion 3a and into the vicinity of, but spaced from, shaft 4. Radial grooves 9a to 11a are of identical configuration and are arranged with nearly identical circumferential spacing. Each groove 6a to 8a and 9a to 11a is connected with the work space of the gear wheel mechanism.

Figure 3:
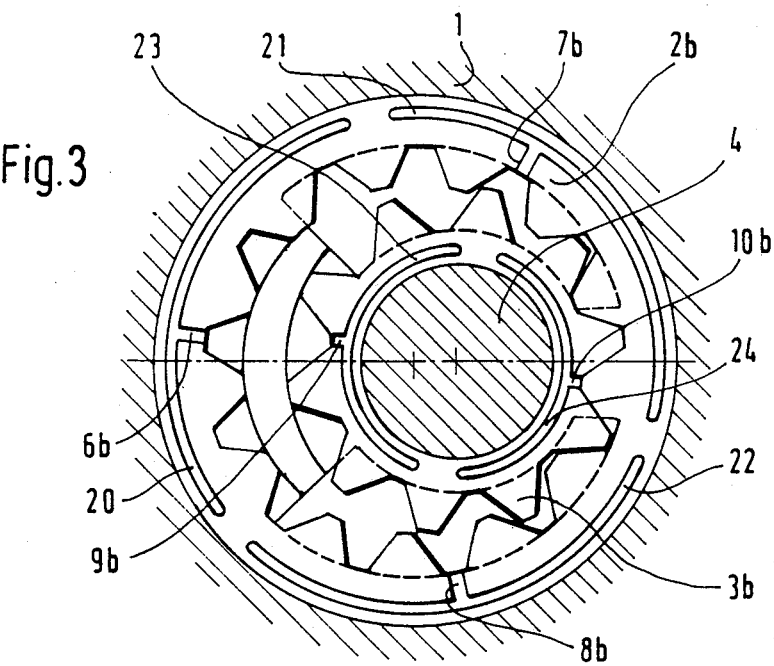
FIG. 3 a front elevational view in section of a gear wheel mechanism according to a third embodiment of the present invention.

In FIG. 3, curved grooves 20-22 and 23-24 are arranged concentric to the middle of hollow gear wheel 2b and pinion 3b, respectively. Each curved groove is connected with a radially extending groove 6b to 10b on hollow gear wheel 2b or on pinion 3b. Hollow gear wheel 2b has three radial grooves 6b to 8b arranged with identical circumferential spacing. Curved grooves 20 to 22 are connected to radial grooves 6b to 8b, respectively, and have only small reciprocal spacings on their ends. Pinion 3b has only two radial grooves 9b and 10b connected with curved grooves 23 and 24, respectively. Each curved groove 23 or 24 extends over approximately a half circle.

Figure 4:
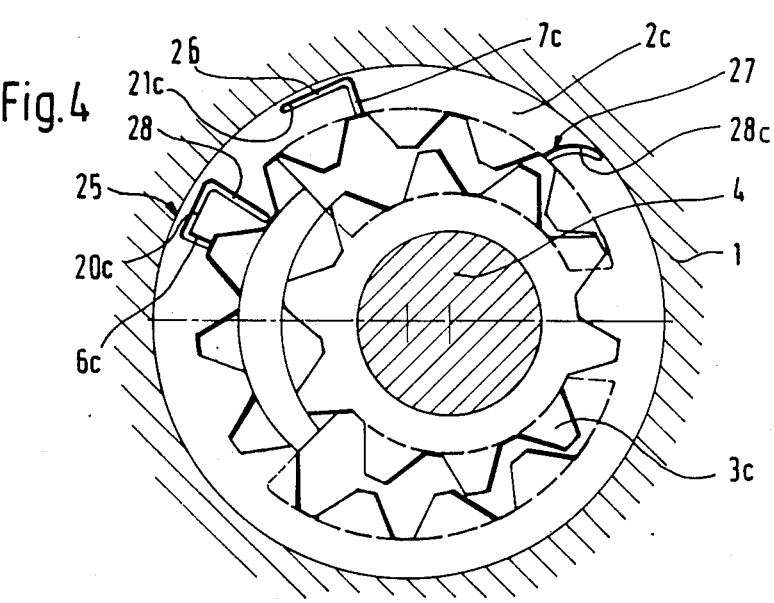
FIG. 4 is a front elevational view in section of a gear wheel mechanism according to a fourth embodiment of the present invention.

The embodiment of FIG. 4 comprises modifications with groove-like recesses 25 to 27 on the front faces of hollow gear wheel 2c. recess 25 has a radial part 6c, a short circumferential part 20c and a radial part 28 directed toward the point of an adjacent tooth. Radial groove 28 does not open into the work space through the tooth point. Recess 26 has a radial groove part 7c, connected to a circumferential groove part 21c reaching only somewhat over a width of an adjacent tooth. Recess 27 is formed by a curved groove 28c with the part adjacent to the base of a tooth space extending radially between two adjacent teeth on hollow gear wheel 2c.

On the periphery of hollow wheel 2c and/or pinion 3c, a certain number of these types of recesses or grooves can be distributed substantially uniformly.

Figure 5:
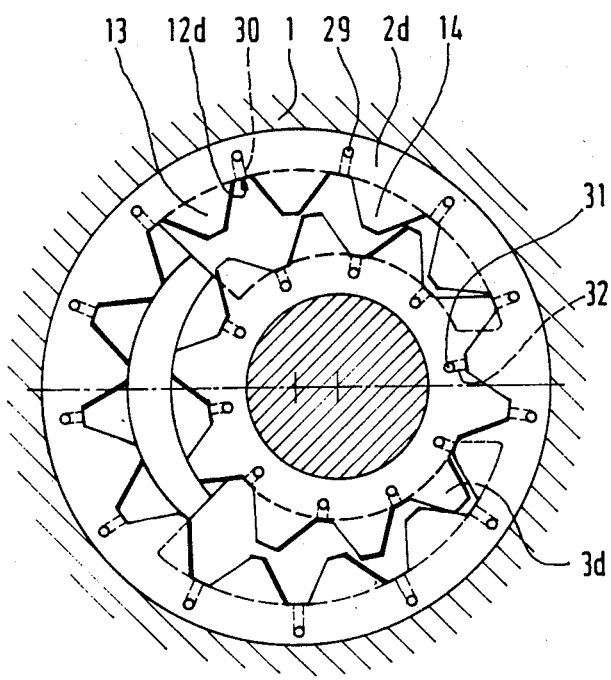
FIG. 5 front elevational view in section of a gear wheel mechanism according to a fifth embodiment of the present invention.
Figure 6:
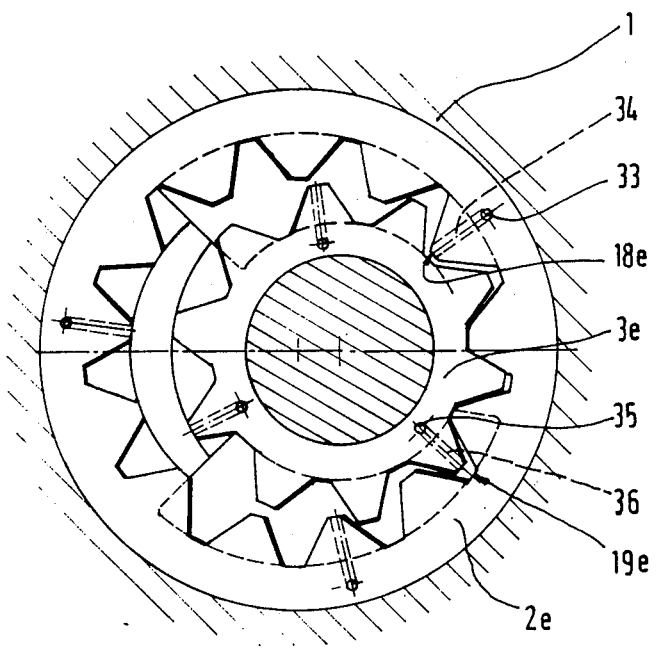
FIG. 6 a front elevational view in section of a gear wheel mechanism according to a sixth embodiment of the present invention.

In the embodiment of FIG. 5, in the area of the base of each tooth space, a crossbore 29/* is arranged at some distance from each tooth base. The ends of the crossbores are recesses opening on a front face of gear wheel 2d in the sense of the invention. Each crossbore 29 is connected by a radial connection bore 30 to the work space. Each connection bore 30 is arranged between the two sides or axial faces of hollow gear wheel 2d and is connected with base 12d between two adjacent teeth 13 and 14. Pinion 3d has crossbores 31 and connection bores 32 corresponding to crossbore 29 and radial connection bore 30, respectively. The number of crossbores 29 and 31 and connection bores 30 and 32 can be selected as desired.*
passing completely through the gear wheel from one front face to the other front face The embodiment of FIG. 6 comprises crossbores 33 and 35,/*arranged on hollow gear wheel 2e and pinion 3e, respectively, in the vicinity of the radial level of the base of the tooth, but at some radially outward spacing from the base level. Each crossbore 33 or 35 is connected with a radial connection bore 34 or 36 extending radially from tooth point 18e or 19e. The number of crossbores 33 and 35 and connection bores 34 and 36 can be selected as desired. *L6 passing completely through the gear wheel from one front face to the other front face.

Instead of providing crossbores 29, 31, 33 or 35 extending completely through the gear wheels, two blind bores, each opening on one of the two sides of hollow gear wheel 2d/e and/or its pinion 3d/e, can be provided. A connection bore 30, 32, 34 or 36 extending from the work space of the gear wheel mechanism would then be associated with each blind bore.

Figure 7:
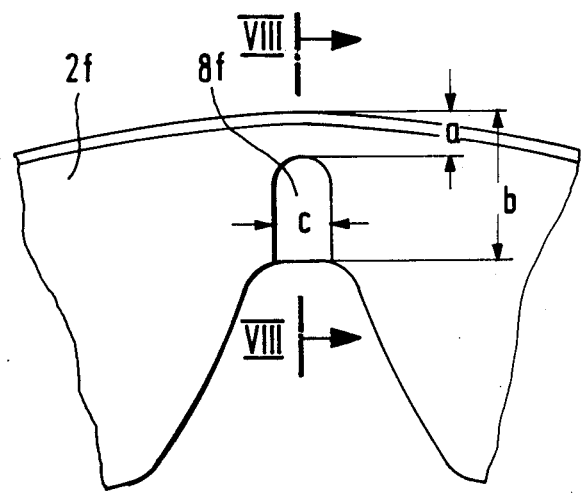
FIG. 7 is an enlarged, partial front elevational view of the outer wheel of FIG. 1.
Figure 8:
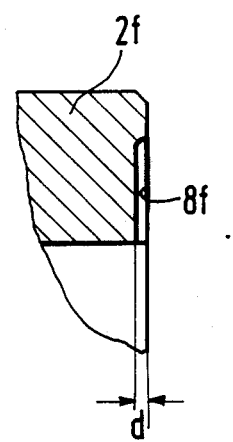
FIG. 8 a partial side elevational view in section taken along lines VIII—VIII of FIG. 7.

FIG. 7 illustrates a hollow gear wheel 2f in a somewhat different position and in larger scale from that shown in FIG. 1. FIG. 8 is a partial section along line VIII-VIII in FIG. 7. The straight radial groove 8f has a somewhat different configuration than radial grooves 6 to 9 in FIG. 1. Radial groove 8f terminates radially outwardly in a curve, especially a semicircular curve. The surface extending from the base of radial groove 8f to the side surface of hollow gear wheel 2f is of curved configuration. The radially outside, closed end of radial groove 8f is spaced a distance a from the outside periphery of hollow gear wheel 2f or from the inside periphery of pinion 3. The radial thickness of hollow gear wheel 2f or of pinion 3 at the base of a tooth space is indicated by dimension b. Groove 3f has a width c and a depth d. Radial grooves 8f on both sides of hollow gear 2f are of identical configuration. Radial grooves 9 to 11 on both sides of the pinion can be configured as radial grooves 6 to 8 or 8f on both sides of hollow gear wheel 2. The radial grooves serve as lubrication and unloading grooves.

In order that the supporting surface on the side of hollow gear wheel 2f, on account of radial groove or grooves 8f, of which three are shown on hollow gear wheel 2 in FIG. 1, is only slightly different from front surface of hollow gear wheel 2f and/or of pinion 3, the following ratios are preferred. The bearing capacity of the side surface of the hollow gear wheel or pinion is still retained for the most part where, $0.5 \geq a/b \geq 0.05$, $c \leq (b-a)$, and $d \geq 0.2$ mm.

At least one radial groove is found on each side of the hollow gear wheel or the pinion. At the most one radial groove per tooth is provided on each of the two sides of the hollow gear wheel or pinion.

The total area of the surfaces of all of the radial grooves on one side of the hollow gear wheel or pinion is smaller than, or identical to 0.3 times the front surface of the hollow gear wheel or pinion.

While various embodiments have been chosen to illustrate the invention, it will be understood by those skilled in the art that various changes and modifications can be made therein without departing from the scope of the invention as defined in the appended claims.

In FIG. 2 are shown recesses N in the wall surface of the housing only being connected with the work space.

What is claimed is:

1. A hydrostatic gear wheel mechanism, comprising:
a housing having pressure and suction ports;
first and second intermeshing gear wheels mounted in said housing, said gear wheels having front faces and pluralities of radially extending teeth, said teeth defining intermediate spaces and bases between adjacent pairs of said teeth, one of said gear wheels being an outer hollow gear wheel with radially inwardly projecting teeth, the other of said gear wheels being a pinion with radially outwardly projecting teeth mounted within said hollow gear wheel;
a work space defined between a radially inner periphery of said outer hollow gear wheel, a radially outer periphery of said pinion and the teeth mating between sadi outer hollow gear wheel and said pinion, opposite ends of said work space being connected to said pressure and suction ports;
an intermediate member in said work space between said gear wheels;
recesses on sadi front faces of said gear wheels, said recesses extending radially relative to said wheels from said bases between said teeth of said gear wheels and being connected with said work space at said bases;
means for connecting each of said recesses only at one end thereof with said work space while the other end thereof ends within the respective gear wheel, for alternating direct fluid communication of each of said recesses with said pressure and suction ports, and for preventing direct fluid communication between said pressure and suction ports through said recesses and said work space as said gear wheels rotate such that said recesses convey fluid for lubrication only.

2. A hydrostatic gear wheel mechanism according to claim 1 wherein the wall surface of the housing has a recess only being connected with said work space.

3. A hydrostatic gear wheel mechanism according to claim 1 said recesses comprises radially extending first portions and circumferentially extending second portions coupled to said first portions.

4. A hydrostatic gear wheel mechanism according to claim 3 wherein said recesses comprises radially extending third portions connected to said second portions at locations spaced from said first portions.

5. A hydrostatic gear wheel mechanism according to claim 1 in which $$0.5 \geq a/b \geq 0.05,$$

$$c \leq (b-a), \text{ and}$$

$$d \geq 0.2 \text{ mm.}$$

wherein
- $a$ = a radial distance between a closed end of a radial portion of one of said recesses and a surface of said first gear wheel remote from said working space;
- $b$ = a radial thickness of said first gear wheel at one of said bases thereof,
- $(b-a)$ = a radial length of one of said recesses,
- $c$ = a width of one of said recesses, and
- $d$ = a depth of one of said recesses.

6. A hydrostatic gear wheel mechanism according to claim 1 wherein at least one of said recesses is provided on each side of said first gear wheel; wherein at most there is one of said recesses per tooth on one of said front faces of said first gear wheel; and wherein said recesses cover a surface area equal to or less than 0.3 times the surface area of one of said front faces.

7. A hydrostatic gear wheel mechanism according to claim 1 wherein said housing has an inlet port and an outlet port at diametrically opposite positions on one axial end wall of said housing defining said work space.

* * * * *